(12) United States Patent
Sodagar

(10) Patent No.: US 11,516,152 B2
(45) Date of Patent: Nov. 29, 2022

(54) FIRST-IN FIRST-OUT FUNCTION FOR SEGMENTED DATA STREAM PROCESSING

(71) Applicant: Tencent America LLC, Palo Alto, CA (US)

(72) Inventor: Iraj Sodagar, Los Angeles, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/028,854

(22) Filed: Sep. 22, 2020

(65) Prior Publication Data

US 2021/0099403 A1 Apr. 1, 2021

Related U.S. Application Data

(60) Provisional application No. 62/907,625, filed on Sep. 28, 2019.

(51) Int. Cl.
*H04L 49/90* (2022.01)

(52) U.S. Cl.
CPC .................................. *H04L 49/90* (2013.01)

(58) Field of Classification Search
CPC . H04L 49/90; H04L 65/4084; H04L 65/4076; H04N 21/44004
See application file for complete search history.

(56) References Cited

U.S. PATENT DOCUMENTS

| 7,096,481 B1* | 8/2006 | Forecast | H04N 21/23406 |
| | | | 348/E5.008 |
| 2003/0206173 A1 | 11/2003 | Kawai et al. | |
| 2007/0177677 A1* | 8/2007 | Thomsen | H04N 19/423 |
| | | | 375/240.26 |
| 2012/0259946 A1* | 10/2012 | Stockhammer | H04N 21/8456 |
| | | | 709/217 |
| 2013/0007223 A1* | 1/2013 | Lu | H04L 65/604 |
| | | | 709/219 |
| 2013/0097287 A1* | 4/2013 | Shauh | H04L 65/605 |
| | | | 709/219 |
| 2017/0060579 A1 | 3/2017 | Vincent et al. | |

OTHER PUBLICATIONS

International Search Report and Written Opinion dated Feb. 24, 2021 in International Application No. PCT/US20/52659, 12 pgs.
Internal Search Report and Written Opinion dated Feb. 2, 2021 in International Application No. PCT/US 20/52675, 12 pgs.
"Text of ISO/IEC DIS 23090-8 Network-based Media Processing" Source Systems Subgroup, ISO/IEC JTC1/SC29/WG11N18657.

* cited by examiner

*Primary Examiner* — Siming Liu
(74) *Attorney, Agent, or Firm* — ArentFox Schiff LLP

(57) ABSTRACT

A method of segmented media data processing can include receiving a first sequence of first segments partitioned from a first data stream of a streaming media, and storing the first segments into a first first-in first-out (FIFO) buffer. In the first FIFO buffer, each first segment and attributes associated with each first segment form an entry of the first FIFO buffer. The attributes associated with each first segment can include a start time of the respective first segment, a duration of the respective first segment, and a length of the respective first segment indicating a number of bytes in the respective first segment. The first segments received from the first FIFO buffer can be processed using a first media processing task of a workflow in a network-based media processing (NBMP) system. The first segments received from the first FIFO buffer can be processed independently from each other.

20 Claims, 7 Drawing Sheets

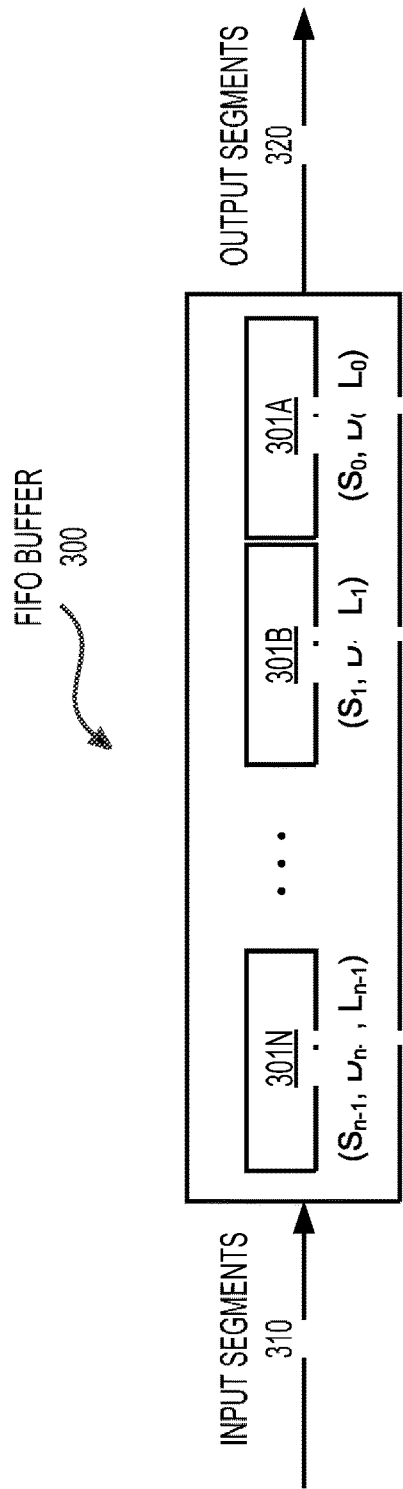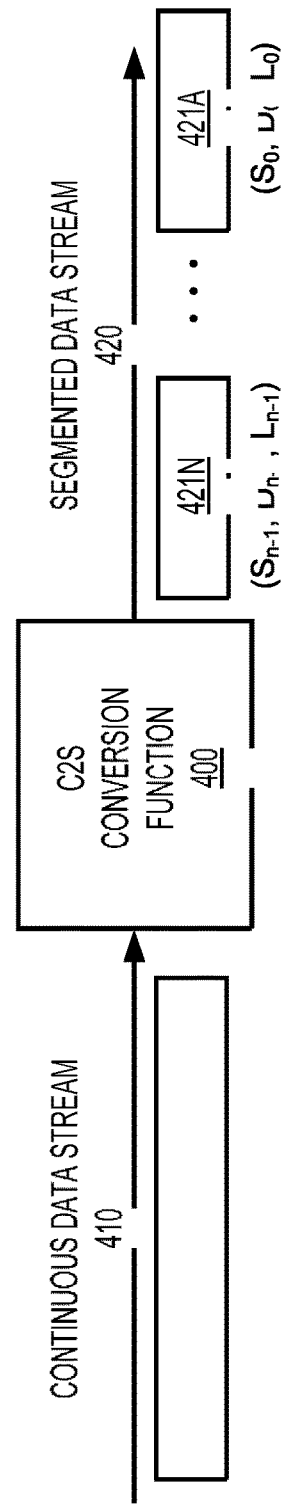

FIRST-IN FIRST-OUT FUNCTION FOR SEGMENTED DATA STREAM PROCESSING

INCORPORATION BY REFERENCE

This present disclosure claims the benefit of priority to U.S. Provisional Application No. 62/907,625, "Indexed FIFO Functions for Segmented Processing in Cloud" filed on Sep. 28, 2019, which is incorporated by reference herein in its entirety.

TECHNICAL FIELD

The present disclosure relates to first-in first-out (FIFO) buffers for segmented data stream processing on a computing platform (e.g., a computer or a cloud platform). Some embodiments are related with Network-based Media Processing (NBMP).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Multimedia service providers face the challenge of adapting their services to multiple cloud and network service providers to reach their customers. These cloud and network service providers oftentimes define their own application programing interfaces (APIs) to assign compute resources to their customers. The Network-based Media Processing (NBMP) standard is being developed to address fragmentation and offer a unified way to perform media processing on top of any cloud platform and on any IP network. NBMP defines a Workflow Manager that can use implementations of ready-made media processing functions and compose them together to create a media processing workflow.

SUMMARY

Aspects of the disclosure provide a method of segmented media data processing. The method can include receiving a first sequence of first segments partitioned from a first data stream of a streaming media, and storing the first segments into a first first-in first-out (FIFO) buffer. In the first FIFO buffer, each first segment and attributes associated with each first segment form an entry of the first FIFO buffer. The attributes associated with each first segment can include a start time of the respective first segment, a duration of the respective first segment, and a length of the respective first segment indicating a number of bytes in the respective first segment. The first segments received from the first FIFO buffer can be processed using a first media processing task of a workflow in a network-based media processing (NBMP) system. The first segments received from the first FIFO buffer can be processed independently from each other.

In an embodiment, the first sequence of the first segments are received from a continuous-to-segmented conversion function that partitions the first data stream of the streaming media from a continuous stream to a segmented stream. In an embodiment, the first sequence of the first segments partitioned from the first data stream of the streaming media are received from a media processing task of the workflow in the NBMP system. In an embodiment, the first data stream of the streaming media is received from a NBMP source of the NBMP system, or from a media processing task of the workflow in the NBMP system.

An embodiment of the method can further includes storing the processed first segments output from the first media processing task of the workflow into a second FIFO buffer. In the second FIFO buffer, each processed first segment and attributes associated with each processed first segment form an entry of the second FIFO buffer. The attributes associated with each processed first segment can include the start time of the respective first segment, the duration of the respective first segment, and a length of the respective processed first segment indicating a number of bytes in the respective processed first segment. In an embodiment, the entries stored in the second FIFO buffer are converted to a continuous stream without the attributes associated with each processed first segment.

An embodiment of the method can further include receiving a second sequence of second segments partitioned from a second data stream of the streaming media, and storing the second segments into a third FIFO buffer. In the third FIFO buffer, each second segment and attributes associated with each second segment form an entry of the third FIFO buffer. The attributes associated with each second segment can include a start time of the respective second segment, a duration of the respective second segment, and a length of the respective second segment indicating a number of bytes in the respective second segment. The second segments received from the third FIFO buffer can be processed using a second media processing task of the workflow in the NBMP system. The second segments received from the third FIFO buffer are processed independently from each other.

Partitioning the first sequence of the first segments from the first data stream is synchronized with partitioning the second sequence of the second segments from the second data stream such that each first segment of the first data stream and the respective second segment of the second data stream correspond to a same time span of the streaming media. In an embodiment, each first segment of the first data stream and the respective second segment of the second data stream have a same start time in the respective attribute associated with each first or second segment.

Aspects of the disclosure provide an apparatus. The apparatus can include circuitry configured to receive a first sequence of first segments partitioned from a first data stream of a streaming media, and store the first segments into a first FIFO buffer. In the first FIFO buffer, each first segment and attributes associated with each first segment form an entry of the first FIFO buffer. The attributes associated with each first segment can include a start time of the respective first segment, a duration of the respective first segment, and a length of the respective first segment indicating a number of bytes in the respective first segment. The first segments received from the first FIFO buffer can be processed using a first media processing task of a workflow in a NBMP system. The first segments received from the first FIFO buffer are processed independently from each other.

BRIEF DESCRIPTION OF THE DRAWINGS

Further features, the nature, and various advantages of the disclosed subject matter will be more apparent from the following detailed description and the accompanying drawings in which:

FIG. 3 shows an example first-in first-out (FIFO) buffer according to an embodiment of the disclosure.

FIG. 4 shows an example continuous-to-segmented (C2S) conversion function according to an embodiment of the disclosure.

DETAILED DESCRIPTION OF EMBODIMENTS

I. Network-Based Media Processing

Aspects of the disclosure describe segmented data stream processing mechanisms related with a network-based media processing (NBMP) framework. The NBMP framework can be employed to initialize and control media processing in a network (e.g., on a cloud platform). For example, a NBMP source describes requested media processing and provides information about the nature and format of media data. In response, an NBMP workflow manager can establish a media processing workflow and inform the NBMP source that the workflow is ready, and the requested media processing can start. The media source(s) can then start transmitting media to the network for processing.

An NBMP workflow can be understood as a connected graph of media processing tasks, each of which performs a well-defined media processing operation. The workflow manager ensures correct operation of the workflow by configuring and monitoring each task as well as a workflow output. The workflow manager is responsible for selection of media processing functions and instantiating the selected functions as tasks based on a workflow description that is received from the NBMP source.

By employment of techniques disclosed herein, a continuous data stream can be converted to a sequence of segments. The segments can then be stored in a first-in first-out (FIFO) buffer with each segment associated with a set of attributes such as a start time, a duration, and a length of the respective segment. Such segments can be processed independently through one or more tasks in a workflow. For example, the segments can be processed in parallel using multiple instances of a same function. Stateless containers in a cloud computing plat form can thus be applied to such segmented media stream processing.

Figure 1:
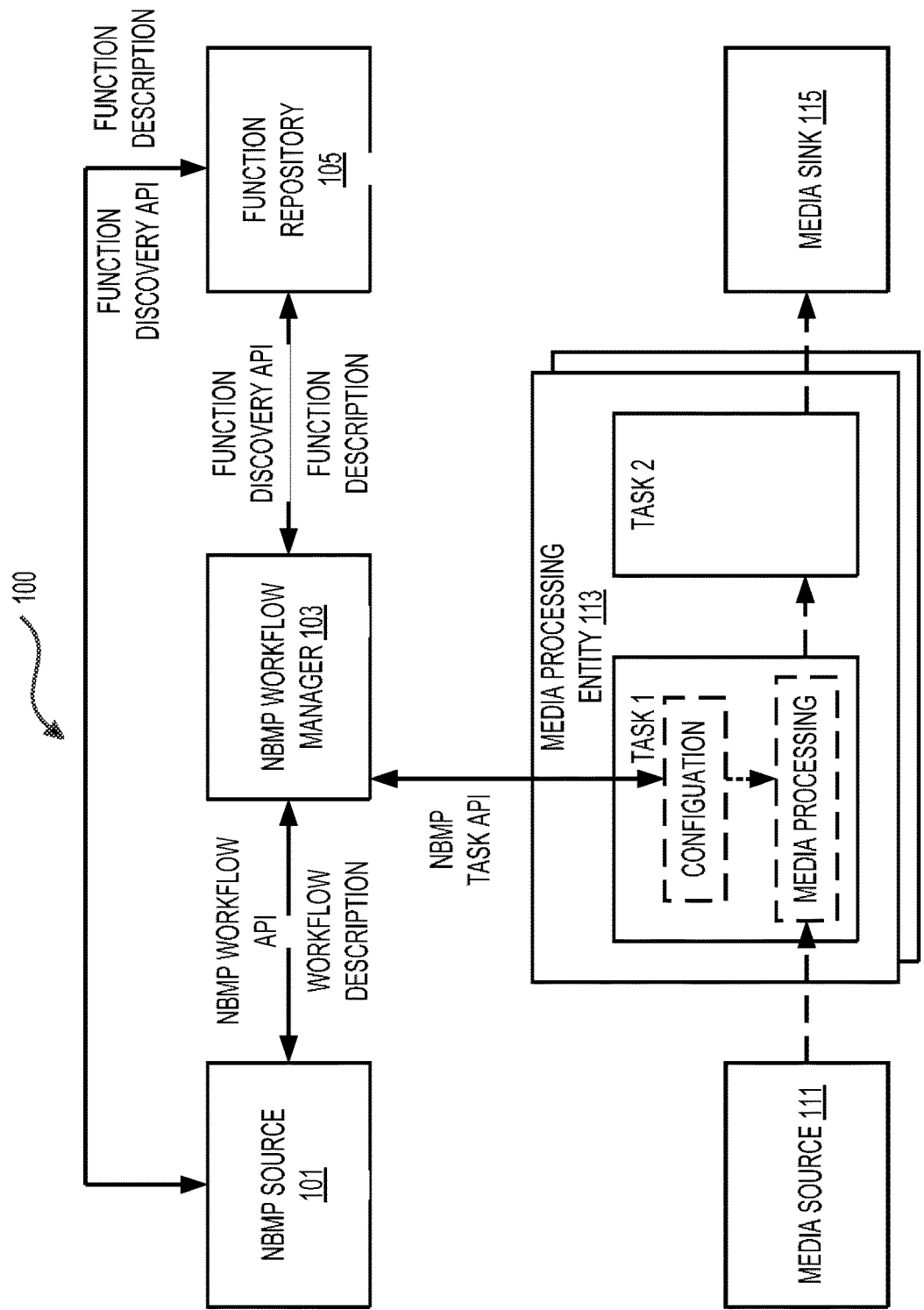
FIG. 1 shows an exemplary data processing system according to an embodiment of the disclosure.

FIG. 1 shows an exemplary NBMP system (100) according to an embodiment of the disclosure. The NBMP system (100) can support existing media delivery methods such as streaming, file delivery, push-based progressive download, hybrid delivery, multipath, and heterogeneous network environments. The NBMP system (100) can also enable emerging media applications by providing various cloud-based media processing capabilities such as network-assisted media quality enhancement (e.g., virtual reality (VR) stitching, video up-scaling, mobile edge encoding for adaptive streaming, and content-aware cloud transcoding), network-assisted media distribution (e.g., live media ingestion, online transcoding, and media-aware caching), network-assisted media composition (e.g., augmented video streaming, and customized media composition), immersive media handling (e.g., network aggregated point cloud media), and the like.

As shown, the NBMP system (100) can include a NBMP source (101), a NBMP workflow manager (103), a function repository (105), a media source (111), a data processing entity (MPE) (113), and a media sink (115). The NBMP system (100) can include additional media source(s), media sink(s), and/or MPEs.

The NBMP source (101) can describe, or otherwise indicate, media processing operations to be performed by the media processing entity (113). The function repository (105) can store various media processing functions. The NBMP source (101) and the NBMP workflow manager (103) can retrieve media processing functions from the function repository (105). A media processing function or a function can be used for performing a specific media processing process, such as a stitching process in a 360 video streaming service, an artificial intelligence (AI) based video up-scaling process in a video delivery service, or the like.

A media processing task or a task can be a runtime instance of a function that is executed by the MPE (113). An NBMP workflow or a workflow can be represented by a graph (e.g., a directed acyclic graph (DAG)) of one or more connected task(s) that achieve the requested media processing. The NBMP workflow manager (103) or the workflow manager (103) can provision task(s) and connect the task(s) to create, control, manage and monitor a workflow, for example, based on a workflow description document (WDD).

The media source (111) can provide media content (e.g., media data, supplementary information) to be processed by a workflow. The supplementary information can include metadata or auxiliary information related to the media data. The media source (111) can provide an input to the workflow. The media sink (115) can consume an output of the workflow. The MPE (113) can run one or more media processing task(s) to process the media content.

Different entities (e.g., the NBMP Source (101), the workflow manager (103) and the MPE (113)) in the NBMP system (100) can use APIs to invoke and respond to media service requests as shown in FIG. 1. The APIs can include a NBMP workflow API (or a workflow API), a function discovery API, and a task API. The workflow API can provide an interface between the NBMP Source (101) and the workflow manager (103). The task API can provide an interface between the workflow manager (103) and media processing tasks. The function discovery API can provide an interface between the workflow manager (103)/the NBMP Source (101) and the Function Repository (105).

The NBMP interfaces described above can be used to create and control media processing workflows in the network. The NBMP system (100) can be split into a control plane and a media plane (or media data plane). The control plane can include the workflow API, the function discovery API, and the task API.

The workflow API can be used by the NBMP source (101) to create and control a media processing workflow. The NBMP Source (101) can use the workflow API to communicate with the workflow manager (103) for configuring and controlling media processing in the network. When the NBMP Source (101) sends a request to the workflow manager (103) by including a workflow resource (WR) in an operation of the workflow API, the workflow manager (103)

can parse the WR, the included WDD and corresponding descriptors, and take the appropriate actions according to the requested operation. Then, the workflow manager (103) can acknowledge the request with a response. The workflow API operations can include creating a workflow (e.g., CreateWorkflow), updating a workflow (e.g., UpdateWorkflow), deleting a workflow (e.g., DeleteWorkflow), retrieving a workflow (e.g., RetrieveWorkflow), and the like.

The function discovery API can provide the means for the workflow manager (103) and/or the NBMP Source (101) to discover media processing functions that can be loaded as part of a media processing workflow.

The task API can be used by the workflow manager (103) to configure and monitor task(s) (e.g., a task 1 and a task 2 run by the MPE (113)) at runtime. The task API can define interface(s) for configuration of media processing tasks by the workflow manager (103), for example, after the resources for the task are allocated in the MPE (113). Task API operations can include creating a task (e.g., CreateTask), updating a task (e.g., UpdateTask), getting a task (e.g., GetTask), deleting a task (e.g., DeleteTask), and the like.

On the media plane, the media formats, the metadata, and the supplementary information formats between the NBMP Source (111) and task(s), as well as between the tasks can be defined.

A workflow description (WD) can be passed from the NBMP source (101) to the workflow manager (103). The WD can describe information such as input data and output data, functions and other requirements for the workflow.

The workflow manager (103) can receive a WDD from the NBMP source (101) and can build a workflow for requested media processing. In a workflow procedure, media processing functions can be selected, for example, from the function repository (105), and then corresponding media processing tasks can be configured and distributed to a set of one or more MPEs (e.g., including the MPE (113)).

The set of functions provided by the function repository (105) can be read by an NBMP source (101) and the workflow manager (103). In an embodiment, the NBMP source (101) requests the creation of a workflow using a set of functions in the function repository (105). Accordingly, the NBMP source (101) is configured to select functions for the workflow. The NBMP source (101) can request the creation of the workflow as described below. The NBMP source (101) can use a description of the media processing tasks by which the workflow is to be created, and can specify a connection map to define connections of inputs and outputs of the media processing tasks. When the workflow manager (103) receives the above information from the NBMP source (101), the workflow manager (103) can instantiate the media processing tasks based on respective function names and can connect the media processing tasks according to the connection map.

Alternatively, the NBMP source (101) can request the creation of a workflow using a set of keywords by which the workflow manager (103) can construct the workflow. Accordingly, the NBMP source (101) may not be aware of a set of functions to be inserted into the workflow. The NBMP source (101) can request the creation of the workflow as described below. The NBMP source (101) can use the set of keywords by which the workflow manager (103) can find the appropriate functions, and can specify the requirements of the workflow using suitable workflow description.

When the workflow manager (103) receives the above information (e.g., the set of keywords) from the NBMP source (101), the workflow manager (103) can create the workflow by searching for appropriate functions using the keywords, for example, specified in a processing descriptor. The workflow manager (103) can then use other descriptors in the workflow description to provision the media processing tasks and connect the media processing tasks to create the final workflow.

A processing model of the workflow manager (103) can be described as below.

The workflow manager (103) can discover available media processing functions as below. The NBMP function repository (105) can provide the function discovery interface (or API) to allow external entities to query for a media processing function that can fulfil the requested processing. The workflow manager (103) can have access to a directory service that offers a searchable list of media processing functions. The workflow manager (103) can use the description of the media processing tasks in the workflow description to find the appropriate functions for the workflow.

Selection of the media processing tasks for the workflow can be described below. When a request for media processing is received from the NBMP source (101), the workflow manager (103) can search the function repository (105) to find the list of all available functions that can fulfill the workflow. Using the workflow description from the NBMP Source (101), the workflow manager (103) can find the functions from the function repository (105) to implement the workflow, which can depend on the information for media processing from the NBMP Source (101). The information for media processing can include the input and output description, the description of the requested processing, and the information in other descriptors for functions in the function directory (105). Mapping of the source requests to appropriate media processing tasks to be included in the workflow can be a part of the implementation of the NBMP in the network. To reference and link input sources with input port names and output port names at the time of task creation, the input-ports and output-ports can be used to make references to the input streams.

A search for appropriate functions to be instantiated as tasks can be performed by the workflow manager (103) using a function discovery API. Alternatively, the workflow manager (103) can retrieve detailed information of some or all suitable functions in the function repository (105) using the function discovery API. The workflow manager (103) can then compare the information for media processing from the NBMP source (101) with different descriptors of each function.

Selected media processing tasks can be configured in the workflow. When the functions to be included in the workflow are identified, the NBMP workflow manager (103) can instantiate the functions as respective tasks and configure the tasks so that the tasks can be added to the workflow. The NBMP workflow manager (103) can extract the configuration data from the media processing information received from the NBMP source (101) and configure the corresponding tasks. The configuration of the Tasks can be performed using a task API (e.g., NBMP task API).

Task allocation and distribution can be described below. The workflow manager (103) can use the workflow to perform processing deployment and configure the media processing entities. In an example, for computationally intensive media processing requests, the workflow manager (103) can set up multiple computational instances and distribute a workload among the multiple computational instances. Thus, the workflow manager (103) can connect and configure the multiple computational instances as needed. In an example, the workflow manager (103) allocates a same task to multiple instances and provisions a load balancer to distribute the workload among the multiple instances using a chosen scheduling mechanism. In an alternative example, the workflow manager (103) allocates different operations of the same task to different instances (e.g., parallel operations). In both examples described above, the workflow manager (103) can set up the workflow paths between the instances, and thus the suitable workload can be successfully realized. The workflow manager (103) can configure the tasks to push the processed media data/ streams (or make them available through a pull mechanism) to a next task in the workflow graph.

When the workflow manager (103) receives a WDD from the NBMP Source (101), the workflow manager (103) can perform a selection of media processing functions to be inserted into the workflow. When the list of tasks to be included in the workflow is compiled, the workflow manager (103) can then connect the tasks to prepare the workflow.

Figure 2:
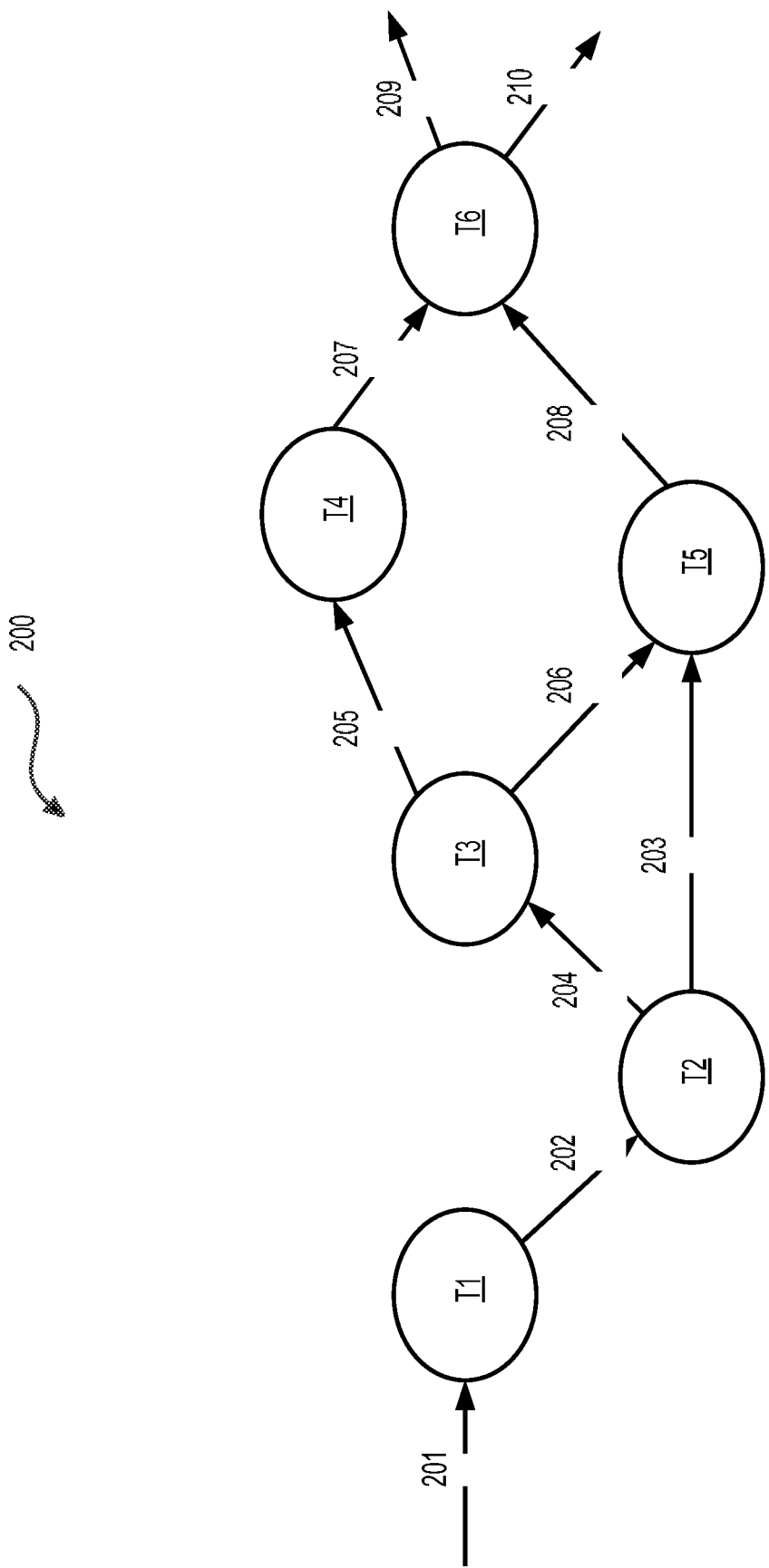
FIG. 2 shows an example of a workflow according to an embodiment of the disclosure.

The workflow manager (103) can generate a workflow, for example, as represented by a graph (e.g., a DAG). FIG. 2 shows an example of a graph (e.g., a DAG) (200) according to an embodiment of the disclosure. The DAG (200) can include a plurality of nodes (T1)-(T6) and a plurality of links (or connections) (202)-(208). In an example, the DAG (200) represents the workflow (200).

Each node of the DAG (200) can represent a media processing task in the workflow (200). A link (e.g., the link (202)) connecting a first node (e.g., the node (T1)) to a second node (e.g., the node (T2)) in the DAG (200A) can represent a transfer of an output of the first node (e.g., the node (T1)) as an input to the second node (e.g., the node (T2)).

In general, a workflow can include any suitable number of input(s) (or workflow input(s)) and any suitable number of output(s) (or workflow output(s)). The workflow input(s) can be connected to the media source (111), other workflow (s), and/or the like, and the workflow output(s) can be connected to the media sink (115), other workflow(s), and/or the like. The workflow (200) has an input (201) and outputs (209) and (210). The workflow (200) can have one or more outputs from intermediate nodes in some embodiments.

II. First-in First-Out (FIFO) Function for Segmented Data Stream Processing

FIG. 3 shows an example FIFO buffer (300) according to an embodiment of the disclosure. The FIFO buffer (300) can be used for implementing a FIFO function for segmented data stream processing. The FIFO buffer (300) can receive a sequence of input segments (310) as an input, and store the received segments as entries (301A-301N).

The sequence of segments (310) can be received from a continuous-to-segmented (C2S) conversion function. The C2S function can receive a data stream of a streaming media, for example, from the media source (111) in the FIG. 1 example, and partition the data stream into the sequence of the segments (310). For example, the streaming media can be a delivery of digital content (e.g., a television program or a movie) over the Internet by a streaming service provider. The data stream can be a bitstream carrying one of various types of content of the streaming media. Examples of the data stream can include a video stream, an audio stream, a metadata stream, a point cloud stream, or the like.

Or, the sequence of segments (310) can be received from a task in a workflow, for example, in the NBMP system (100). A data stream can be partitioned into a sequence of segments before being fed into the task for processing. The task then outputs the sequence of segments (310).

The entries (310A-310N) can each include a segment belonging to the sequence of segments (310) and a set of attributes associated with the segment. For example, the attributes of each segment can be associated to the respective segment when the respective segment is generated (e.g., partitioned from a data stream), or after the respective is processed by a task.

In an embodiment, the attributes in each entry include a start time denoted by $S_i$ indicating a start time of the respective segment, a duration $D_i$, indicating a duration of the respective segment when displayed, and a length $L_i$ (or a size) indicating a length of the respective segment, for example, in terms of a number of bytes in the respective segment. The parameter i represents an index corresponding to each segment. As shown, the entry (301A) includes attributes $S_0$, $D_0$, and $L_0$; the entry (301B) includes attributes $S_1$, $D_1$, and $L_1$; and the entry (301B) includes attributes $S_{n-1}$, $D_{n-1}$, and $L_{n-1}$.

In an example, the start time of each segment in the sequence of segments (310) can be a time with respect to a start time of the data stream the segment is partitioned from, or any time within the span of the data stream designated as a time reference. Or, the start time can be a time with respect to a timing reference, such as a clock providing a clock signal. The duration of each segment in the sequence of segments (310) can be a time span corresponding to a period of time for displaying the segment when the data stream of the streaming media is being displayed. The start time and the duration of each segment can be represented in units of second, millisecond, or the like. In various embodiments, the durations of each segment in the sequence of segments (310) can be the same or different.

In an embodiment, the set of attributes of each segment includes only the attribute of the start time, and the attributes of the duration and the length are optional. For example, when the duration and the length for each segment are equal, the attributes of the duration and the length can be omitted. In an embodiment, the set of attributes of each segment includes an index indicating an order of each segment in the sequence of segments (310). In an example, when the index attribute is used, the attributes of the start time, the duration, and the length can be optional. Both the start time attribute and the index attribute can serve the purpose of indexing each segment. Accordingly, the FIFO buffer (300) storing the indexed segments can be referred to as an indexed segment FIFO denoted by iFIFO.

In an embodiment, each entry (301A-301N) can be read from the FIFO buffer (300) to provide a sequence of output segments (320) in a first-in first-out manner. In an example, the sequence of input segments (310) have been processed by one or more of tasks of a workflow, and then stored in the FIFO buffer (300). The output segments (320) read from the FIFO buffer (300) is then concatenated together by a segmented-to-continuous (S2C) conversion function to form a continuous data stream. The continuous data stream can then be output from the workflow.

In an example, the sequence of input segments (310) are partitioned from a data stream of a streaming media in a previous step. The output segments (320) read from the FIFO buffer (300) is then input to a task of a workflow for processing. In an example, the sequence of input segments (310) have been processed by one or more of tasks of a workflow, and then stored in the FIFO buffer (300). The output segments (320) read from the FIFO buffer (300) is then input to a next task of the workflow for further processing.

In an embodiment, the FIFO buffer (300) can be configured with a set of configuration parameters. In an example, the configuration parameters can include a size of the FIFO buffer (300), for example, in a number of entries, and a maximum size of the entries in the FIFO buffer (300). In an example, the configuration parameters can be received from the NBMP source (101) in the FIG. 1 example that specifies how the FIFO buffer (300) is to be configured and operated in a workflow. In an example, the configuration parameter is determined by the NBMP workflow manager (103) based on information received from the NBMP source (101). For example, the information can include parameters describing a data stream of a streaming media to-be-processed with a workflow, and/or parameters describing a function that is before or after the FIFO buffer (300) in the workflow. The NBMP workflow manager (103) can then determine how to configure the FIFO buffer (300) in the workflow based on that information.

FIG. 4 shows an example C2S conversion function (400) according to an embodiment of the disclosure. The C2S conversion function (400) can be configured to receive a continuous data stream (410) of a streaming media, and partition the continuous data stream (410) into a segmented data stream (420).

The segmented data stream (420) can include a sequence of segments (421A-421N) each associated with a set of attributes, such as attributes of a start time, a duration, and a length of the respective segment. The segmented data stream 420 can then be input to a FIFO function, such as the FIFO function (300).

The data stream (410) can be a data stream received from the media source (111), and is input to the C2S conversion function (400) before entering a workflow for processing. Or, the data stream (410) can be a data stream that has been processed by a function of a workflow before reaching the C2S conversion function (400).

Partitioning operation of the C2S conversion function (400) can be performed in such a way that the resulting segments (421A-421N) can be subsequently processed independently. In an example, the resulting segments (421A-421N) can be processed in parallel in a workflow with multiple instances of a same media processing function in the workflow to accelerate processing speed.

In an example, the resulting segments (421A-421N) can be processed with a step mode. For example, in a computing platform (e.g., a computer or a cloud platform) with limited resources, tasks belonging to a same workflow may not be run at the same time. Instead, the tasks connected in series can be instantiated successively to process a group of segments. A current group of segments can be processed step by step (task by task) passing through the workflow before a next group of segments can enter the workflow.

In an embodiment, containerized tasks are employed in a cloud computing environment where a task can run within a stateless container that runs on top of a single operating system kernel and emulates an operating system rather than the underlying hardware. The independent segments (421A-421N) resulting from the C2S conversion function (400) can thus be suitably processed within such containers either in parallel or in step mode.

The partitioning operation at the C2S conversion function (400) can depend on internal structures of the data stream (410). In various examples, the data stream (410) may be of various types and have various formats, and can be, for example, a point cloud data stream, a video stream, an audio stream, or the like. Each type of data stream may have a specific internal structure. The C2S conversion function (400) can identify the different structures, and accordingly partition the respective data stream into segments. While partitioning, a set of attributes (e.g., a start time, a duration, a length (size), or the like) of the respective segment can be determined and associated with the respective segment.

For example, the data stream (410) can be a video including structures of group of pictures (GOPs). Pictures (or frames) within a GOP can reference other members of the GOP for inter prediction coding. However, each GOP in the video can be processed independently. Accordingly, the partitioning can be performed on a basis of GOPs. For example, one or more GOPs in the video can be included in one segment. The resulting segments can thus be processed independently.

In another example, a video compliant with High Efficiency Video Coding (HEVC) standard may include structures of random access point (RAP) pictures to facilitate users jumping to specific parts of the video. Such RAP pictures (e.g., an instantaneous decoding refresh (IDR) picture) can be used as a start of a segment for the partitioning operation.

In addition, while partitioning the video in the above examples of the partitioning operation, a start time of each segment can be determined based on the location where a partition operation takes place in the video. For example, in the above examples, each picture can be associated with a picture order count (POC) indicating an order of pictures in the video. Based on the POC information, a timing of a picture where the partition takes place can be determined and associated with respect segment. Similarly, based on information of the internal structure of the video, a duration and a length (size) of the respective segment can be determining while partitioning the video.

Figure 5:
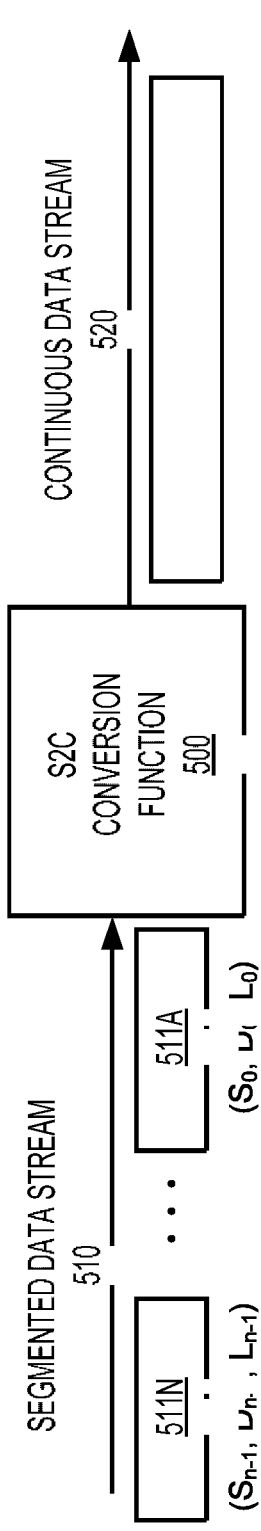
FIG. 5 shows an example segmented-to-continuous (S2C) conversion function according to an embodiment of the disclosure.

FIG. 5 shows an example S2C conversion function (500) according to an embodiment of the disclosure. The S2C conversion function (500) can be configured to receive a segmented data stream (510), and convert the segmented date stream (510) to a continuous data stream (520). The segmented data stream (510) can include a sequence of segments (511A-511N) each associated with a set of attributes. For example, the set of attributes can include a start time, a duration, and a length of the respective segment. The sequence of segments (511A-511N) can be an output of a task in a workflow.

In an example, the S2C conversion function (500) removes the attributes associated with the segments (511A-511N), and concatenates the sequence of the segments (511A-511N) to generate the continuous data stream (520). The continuous data stream (520) can then be input to a next task of the workflow for further processing. Or, the continuous data stream (520) can be transmitted to a media sink as an output of the workflow.

Figure 6:
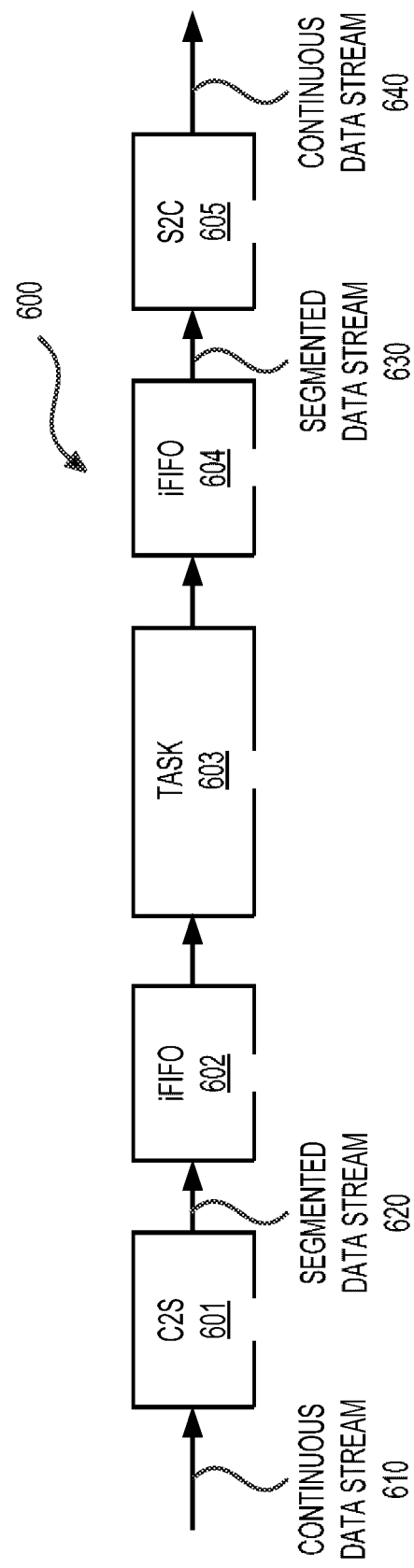
FIG. 6 shows an example processing path according to an embodiment of the disclosure.

FIG. 6 shows an example processing path (600) according to an embodiment of the disclosure. The processing path can be part of a workflow in a NBMP system. The processing path (600) includes a series of a C2S conversion function (601), a first iFIFO buffer (602), a task (603), a second iFIFO buffer (604), and a S2C conversion function (605).

A continuous data stream (610) is received at the C2S conversion function (601). The continuous data stream (610) can be an output of a previous task, or transmitted from a media source such as the media source (111) in the FIG. 1 example. The C2S conversion function (601) partitions the continuous stream (601) into a sequence of segments each associated with a set of attributes (e.g., a start time, a duration, a length, or the like). The sequence of segments is output from the C2S conversion function (601) as a segmented data stream (620). The iFIFO buffer (602) receives the segmented data stream (620) and stores the segments and associated attributes as entries.

The entries are then read from the iFIFO buffer (602) and processed by the task (603). The task (603) can be a media processing task instantiated from a media processing function. In an example, the task (603) can be configured to be multiple instances of a same function. Accordingly, the segments in the iFIFO buffer (602) can be fed to the multiple instances and processed in parallel. In an example, the task (603) can be configured to operate in step mode. Specifically, the task (603) can be instantiated to process a group of segments received from the iFIFO buffer (602) and then terminated.

The iFIFO buffer (604) receives processed segments each associated with the attributes from the task (603), and stores the processed segments and attributes in form of entries. The entries in the iFIFO buffer (604) are then input to the S2C conversion function (605) as a segmented data stream (630). The S2C conversion function (605) concatenates the segments in the segmented data stream (630) to generate a continuous data stream (640).

While only one task (603) is shown in the processing path (600), there can be more than one tasks configured in place of the task (603) in other examples. Between a pair of consecutive tasks among those tasks, there can be an iFIFO buffer employed to connect the pair of tasks. Of course, some pairs of consecutive tasks can be directly connected in each pair without an iFIFO buffer.

Figure 7:
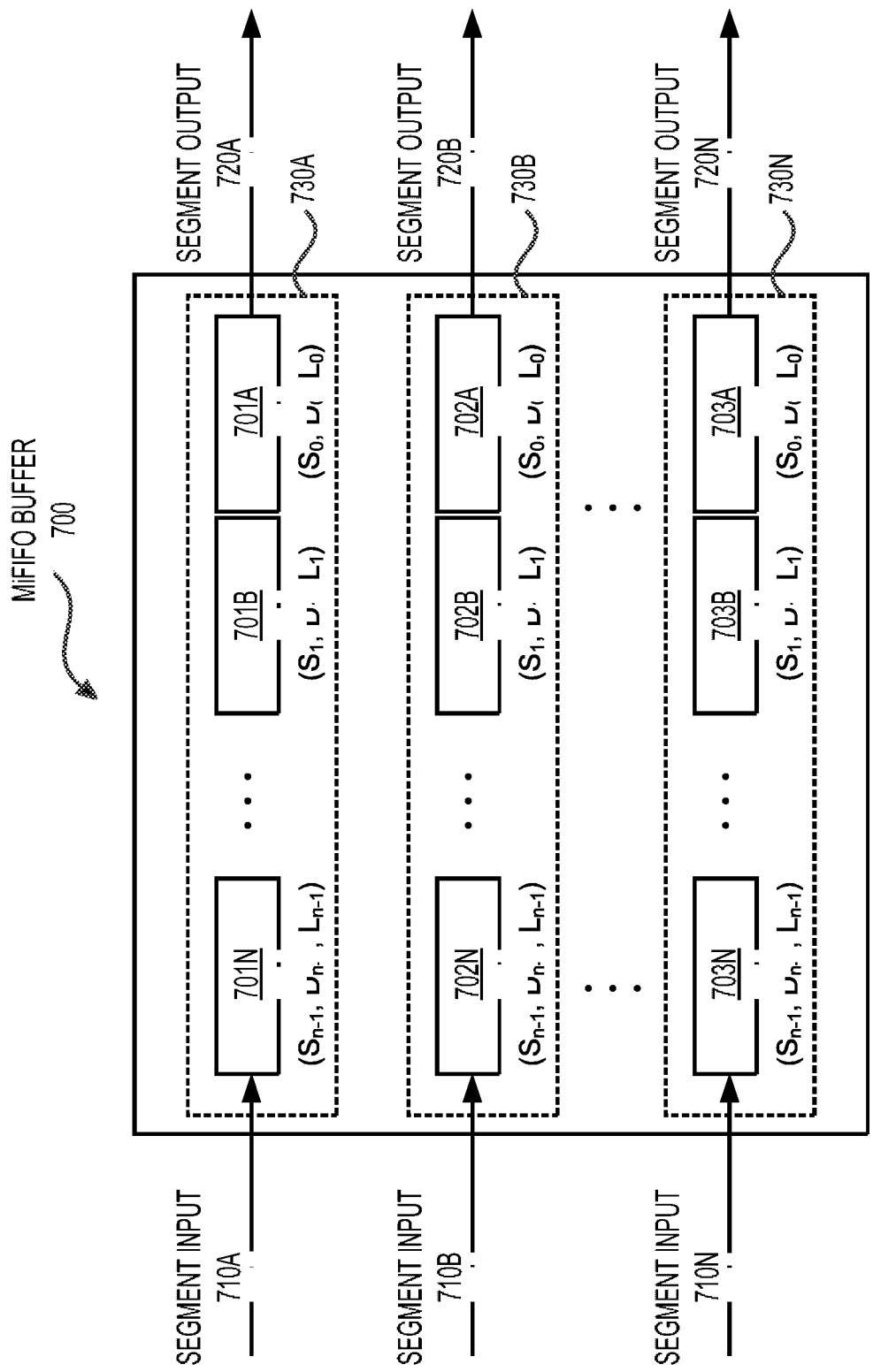
FIG. 7 shows a multi-indexed segment FIFO (MiFIFO) function according to an embodiment of the disclosure.

FIG. 7 shows a multi-indexed segment FIFO (MiFIFO) function (700) according to an embodiment of the disclosure. The MiFIFO function (700) can include multiple FIFO buffers (730A-730N) operating in parallel. The MiFIFO function (700) can receive multiple segment inputs (710A-710N) (e.g., 2, 3, or more segment inputs) at the multiple FIFO buffers (730A-730N), respectively. Each segment input (710A-710N) can be a sequence of segments that are each associated with a set of attributes. The sequence of segments and the associated attributes are stored as entries in each FIFO buffer (730A-730N). For example, the FIFO buffer (730A) can include entries (701A-701N), the FIFO buffer (730B) can include entries (702A-702N), and the FIFO buffer (730N) can include entries (703A-703N). The entries in each FIFO buffer (730A-730N) can be read out in a first-in first-out manner as multiple segment outputs (720A-720N).

In an example, data streams corresponding to the segment inputs (710A-710N) can belong to a same streaming media. For example, the data streams can include one or more video streams, one or more audio streams, one or more metadata streams, or the like. When being displayed, contents belonging to different data streams but corresponding to a same time span can be displayed synchronously. To serve this purpose, contents belonging to different data streams but corresponding to a same span are desired to be processed by a workflow in a synchronized manner.

Accordingly, in an embodiment, segmentation of the segments in each segment input (710A-710N) can be performed synchronously. For example, the locations in each data stream where the segmentation takes place can be time aligned. As a result, the resulting segments overlapping a same time span can be time aligned, and have a same start time and a same duration. For example, the entries 701A, 702A, and 703A can have a same start time and a same duration. During processing by one or more functions before or after the MiFIFO function (700) in the workflow, segments belonging to different data streams but corresponding to a same time span can be processed in a synchronous way such that contents of different data stream but the same time span can be delivered to a use for display properly.

In various embodiments, the segment inputs (710A-710N) can each be output from a different C2S conversion function, or a different media processing function. Or, two or more segments inputs (710A-710N) can be output from a same C2S conversion function or a same media processing function. Similarly, the segment outputs (720A-720N) can each be output to a different S2C conversion function or a different media processing function. Or, two or more segment outputs (720A-720N) can be provided to a same S2C conversion function or a same media processing function.

In a workflow including multiple tasks and multiple processing paths, MiFIFO functions can be configured to each connect two groups of tasks: one group of tasks resides at an input side, and the other group of tasks resides at an output side of the respective MiFIFO function.

It is noted that the FIFO buffer mechanism disclosed herein is not limited to a NBMP system although the iFIFO function and MiFIFO function in some examples are explained in the context of NBMP. The FIFO buffers can be applied to media data or non-media data processing scenarios where a workflow-like process including multiple tasks is employed.

In addition, the FIFO functions disclosed herein can be implemented by processing circuitry (e.g., one or more processors or one or more integrated circuits). Or, the FIFO functions disclosed herein can each be implemented as instructions of a program stored in a non-transitory computer-readable storage medium. The instructions, when executed by one or more processors, can cause the processors to carry out a FIFO function.

II. Example Processes of Segmented Data Stream Processing

Figure 8:
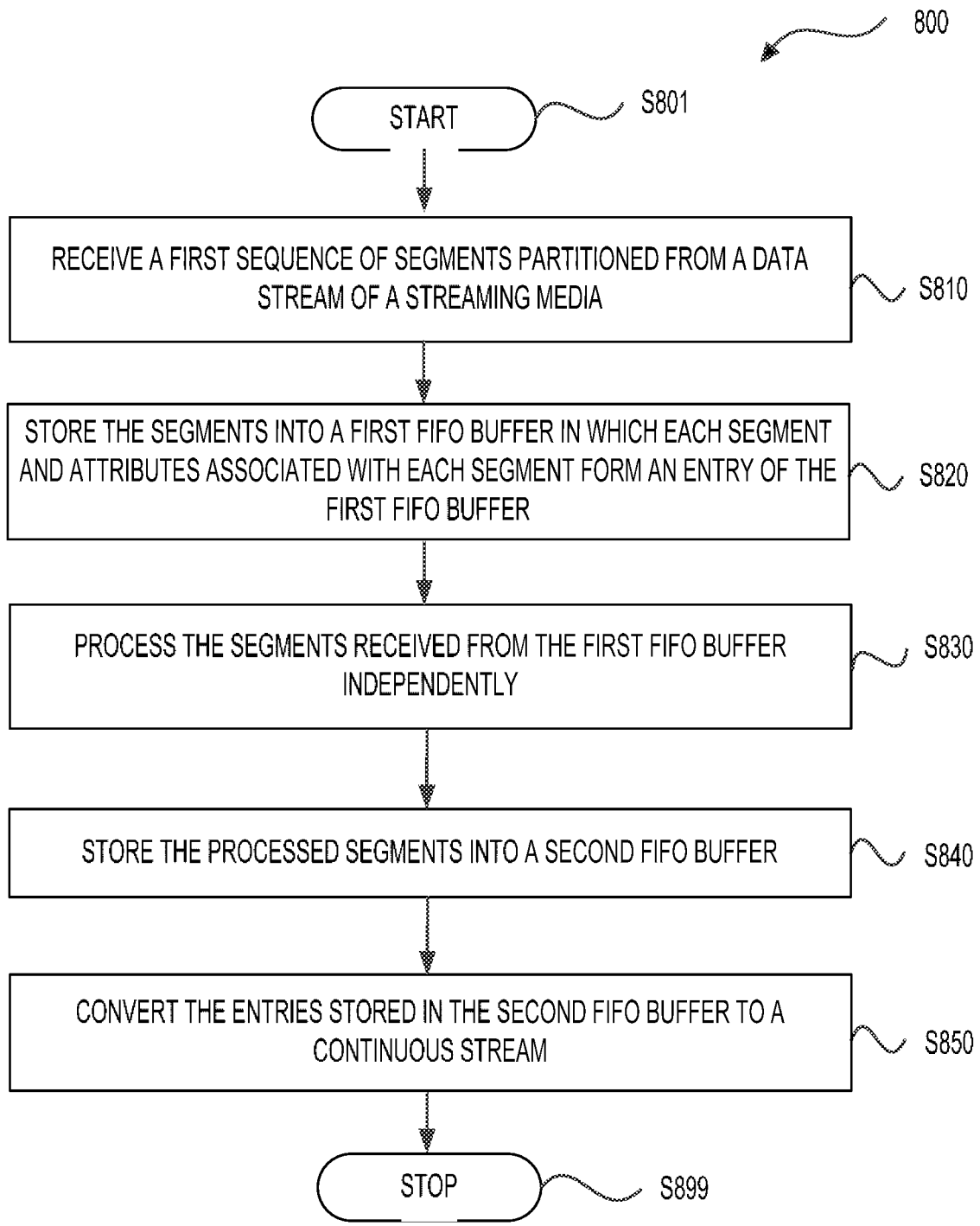
FIG. 8 shows an example process of a segmented data stream processing process according to an embodiment of the disclosure.

FIG. 8 shows an example process (800) of a segmented data stream processing process according to an embodiment of the disclosure. The process (800) can be part of a process for media processing using a workflow in a NBMP system. The process (800) can start from (S801) and proceed to (S810).

At (S810), a sequence of segments partitioned from a data stream of a streaming media can be received. For example, the sequence of segments can be received from a C2S conversion function or from a media processing task of the workflow in the NBMP system. The streaming media can include one or more data streams, and be transmitted from a media source over a network (e.g., the Internet).

At (S820), the segments can be stored into a first FIFO buffer. For example, each segment and associated one or more attributes can be stored as an entry in the first FIFO buffer. The attributes can include one or more of a start time, a duration, and a length of the respective segments.

At (S830), the segments are read from the first FIFO buffer and processed by a task in the workflow. For example, the segments are processed independently from each other. In one example, the segments are processed in parallel. In an example, tasks in the workflow operate in step mode. Accordingly, the segments can be organized into groups that are each processed independently by the workflow and pass through the workflow step by step.

At (S840), after being processed at (S830), the segments can then be stored in a second FIFO buffer with associated attributes. For example, the attributes of each processed segments can have the same start time and duration as the attributes associated with the segments before being processed at (S830). Each processed segment can have a length attribute indicating a size (e.g., a number of bytes) of the processed segment that may have changed compared with the length before being processed.

At (S850), the processed segments can then be read from the second FIFO buffer and input to a S2C function, and be converted to a continuous data stream. The continuous data stream can be output from the work flow in an example. The process (800) can then proceed to (S899) and terminate at (S899).

IV. Computer System

The methods, embodiments, entities, or functions disclosed herein may be implemented by processing circuitry (e.g., one or more processors or one or more integrated circuits). In one example, the one or more processors execute a program that is stored in a non-transitory computer-readable medium to perform the methods, embodiments, or functions disclosed herein. The program can be coded using any suitable machine code or computer language, that may be subject to assembly, compilation, linking, or like mechanisms to create code comprising instructions that can be executed directly, or through interpretation, micro-code execution, and the like, by one or more CPUs, GPUs, and the like. The instructions can be executed on various types of computers or components thereof, including, for example, personal computers, tablet computers, servers, smartphones, gaming devices, internet of things devices, and the like.

Figure 9:
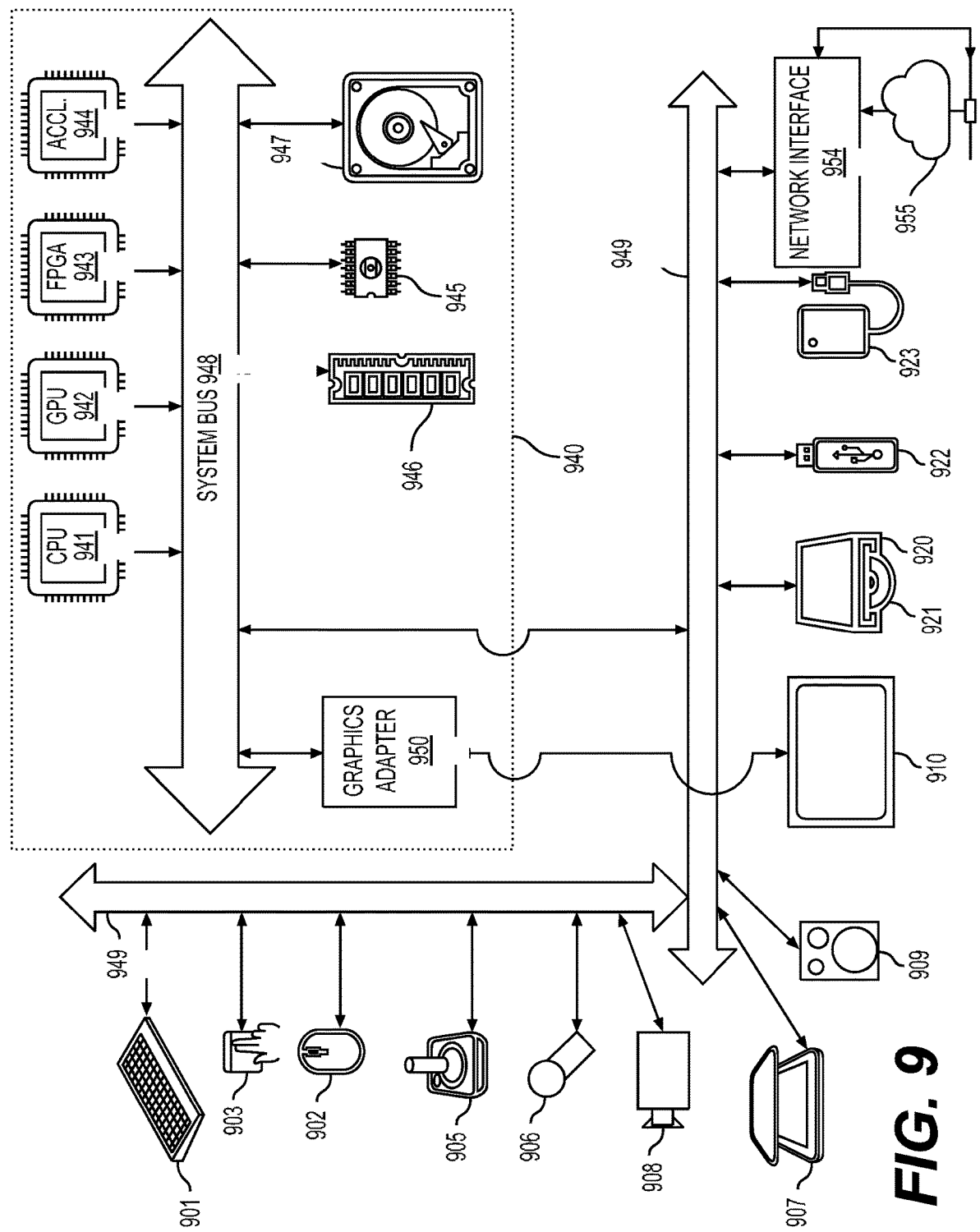
FIG. 9 shows a schematic illustration of a computer system according to an embodiment of the disclosure.

FIG. 9 shows a computer system (900) suitable for implementing certain embodiments of the disclosed subject matter. The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as screens (910) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include an interface (954) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adaptors that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described herein.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, graphics adapters (950), and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). In an example, the screen (910) can be connected to the graphics adapter (950). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described above, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method, comprising:
receiving a first sequence of first segments partitioned from a first data stream of a streaming media and receiving respective attributes associated with each of the received first segments;
storing the first segments into a first first-in first-out (FIFO) buffer, each first segment and the respective attributes form an entry of the first FIFO buffer, the attributes associated with each first segment including a start time of the respective first segment, a duration of the respective first segment, and a length of the respective first segment indicating a number of bytes in the respective first segment; and
processing the first segments output from the first FIFO buffer using a first media processing task of a workflow in a network-based media processing (NBMP) system, wherein the first segments and the respective attributes are output from the first FIFO buffer entry by entry and processed independently from each other.

2. The method of claim 1, wherein the receiving the first sequence of the first segments includes:
receiving the first sequence of the first segments from a continuous-to-segmented conversion function that partitions the first data stream of the streaming media from a continuous stream to a segmented stream.

3. The method of claim 1, wherein the receiving the first sequence of the first segments includes:
receiving the first sequence of the first segments partitioned from the first data stream of the streaming media from a second media processing task of the workflow in the NBMP system.

4. The method of claim 1, wherein the first data stream of the streaming media is received from a NBMP source of the NBMP system, or from a third media processing task of the workflow in the NBMP system.

5. The method of claim 1, further comprising:
storing the processed first segments output from the first media processing task of the workflow into a second FIFO buffer in which each processed first segment and attributes associated with each processed first segment form an entry of the second FIFO buffer, the attributes associated with each processed first segment including the start time of the respective processed first segment, the duration of the respective processed first segment, and a length of the respective processed first segment indicating a number of bytes in the respective processed first segment.

6. The method of claim 5, further comprising:
converting the entries stored in the second FIFO buffer to a continuous stream without the attributes associated with each processed first segment.

7. The method of claim 1, further comprising:
receiving a second sequence of second segments partitioned from a second data stream of the streaming media;
storing the second segments into a third FIFO buffer in which each second segment and attributes associated with each second segment form an entry of the third FIFO buffer, the attributes associated with each second segment including a start time of the respective second segment, a duration of the respective second segment, and a length of the respective second segment indicating a number of bytes in the respective second segment; and
processing the second segments output from the third FIFO buffer using a fourth media processing task of the workflow in the NBMP system wherein the second segments output from the third FIFO buffer are processed independently from each other,
wherein partitioning the first sequence of the first segments from the first data stream is synchronized with partitioning the second sequence of the second segments from the second data stream such that each first segment of the first data stream and a corresponding synchronized second segment of the second data stream correspond to a same time span of the streaming media.

8. The method of claim 7, wherein each first segment of the first data stream and the corresponding synchronized second segment of the second data stream have a same start time in the respective attribute associated with each first or second segment.

9. An apparatus, comprising:
circuitry configured to:
receive a first sequence of first segments partitioned from a first data stream of a streaming media and receive respective attributes associated with each of the received first segments;
store the first segments into a first first-in first-out (FIFO) buffer, each first segment and the respective attributes form an entry of the first FIFO buffer, the attributes associated with each first segment including a start time of the respective first segment, a duration of the respective first segment, and a length of the respective first segment indicating a number of bytes in the respective first segment; and
process the first segments output from the first FIFO buffer using a first media processing task of a workflow in a network-based media processing (NBMP) system, wherein the first segments and the respective attributes are output from the first FIFO buffer entry by entry and processed independently from each other.

10. The apparatus of claim 9, wherein the circuitry is further configured to:
receive the first sequence of the first segments from a continuous-to-segmented conversion function that partitions the first data stream of the streaming media from a continuous stream to a segmented stream.

11. The apparatus of claim 9, wherein the circuitry is further configured to:
receive the first sequence of the first segments partitioned from the first data stream of the streaming media from a second media processing task of the workflow in the NBMP system.

12. The apparatus of claim 9, wherein the first data stream of the streaming media is received from a NBMP source of the NBMP system, or from a third media processing task of the workflow in the NBMP system.

13. The apparatus of claim 9, wherein the circuitry is further configured to:
store the processed first segments output from the first media processing task of the workflow into a second FIFO buffer in which each processed first segment and attributes associated with each processed first segment form an entry of the second FIFO buffer, the attributes associated with each processed first segment including the start time of the respective processed first segment, the duration of the respective processed first segment, and a length of the respective processed first segment indicating a number of bytes in the respective processed first segment.

14. The apparatus of claim 13, wherein the circuitry is further configured to:
convert the entries stored in the second FIFO buffer to a continuous stream without the attributes associated with each processed first segment.

15. The apparatus of claim 9, wherein the circuitry is further configured to:

receive a second sequence of second segments partitioned from a second data stream of the streaming media;
store the second segments into a third FIFO buffer in which each second segment and attributes associated with each second segment form an entry of the third FIFO buffer, the attributes associated with each second segment including a start time of the respective second segment, a duration of the respective second segment, and a length of the respective second segment indicating a number of bytes in the respective second segment; and
process the second segments output from the third FIFO buffer using a fourth media processing task of the workflow in the NBMP system wherein the second segments output from the third FIFO buffer are processed independently from each other,
wherein partitioning the first sequence of the first segments from the first data stream is synchronized with partitioning the second sequence of the second segments from the second data stream such that each first segment of the first data stream and a corresponding synchronized second segment of the second data stream correspond to a same time span of the streaming media.

16. The apparatus of claim 15, wherein each first segment of the first data stream and the corresponding synchronized second segment of the second data stream have a same start time in the respective attribute associated with each first or second segment.

17. A non-transitory computer-readable medium storing instructions that, when executed by a processor, cause the processor to perform a method, the method comprising:
receiving a first sequence of first segments partitioned from a first data stream of a streaming media and receiving respective attributes associated with each of the received first segments;
storing the first segments into a first first-in first-out (FIFO) buffer, each first segment and the respective attributes form an entry of the first FIFO buffer, the attributes associated with each first segment including a start time of the respective first segment, a duration of the respective first segment, and a length of the respective first segment indicating a number of bytes in the respective first segment; and
processing the first segments output from the first FIFO buffer using a first media processing task of a workflow in a network-based media processing (NBMP) system, wherein the first segments and the respective attributes are output from the first FIFO buffer entry by entry and processed independently from each other.

18. The non-transitory computer-readable medium of claim 17, wherein the receiving the first sequence of the first segments includes:
receiving the first sequence of the first segments from a continuous-to-segmented conversion function that partitions the first data stream of the streaming media from a continuous stream to a segmented stream.

19. The non-transitory computer-readable medium of claim 17, wherein the receiving the first sequence of the first segments includes:
receiving the first sequence of the first segments partitioned from the first data stream of the streaming media from a second media processing task of the workflow in the NBMP system.

20. The non-transitory computer-readable medium of claim 17, wherein the first data stream of the streaming media is received from a NBMP source of the NBMP system, or from a third media processing task of the workflow in the NBMP system.

\* \* \* \* \*